Nov. 16, 1926.  
L. F. MOODY  
1,606,887  
HYDRAULIC TURBINE  
Original Filed May 16, 1921   2 Sheets-Sheet 1
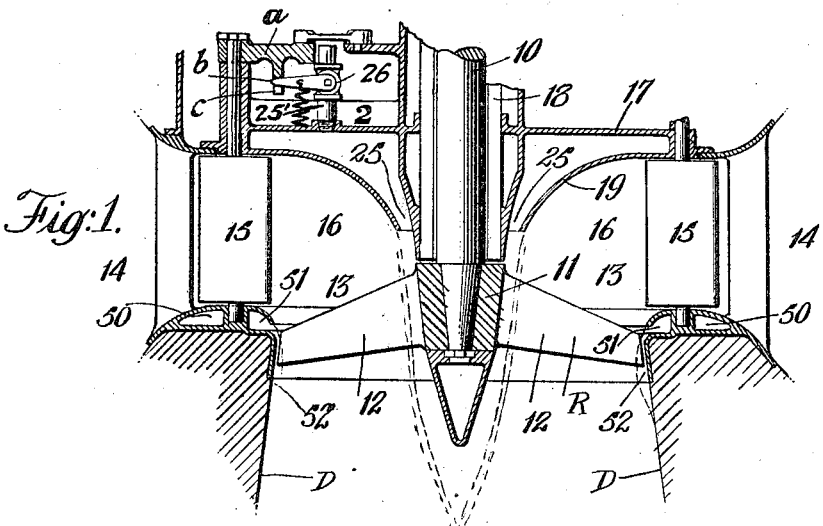
Fig:1.
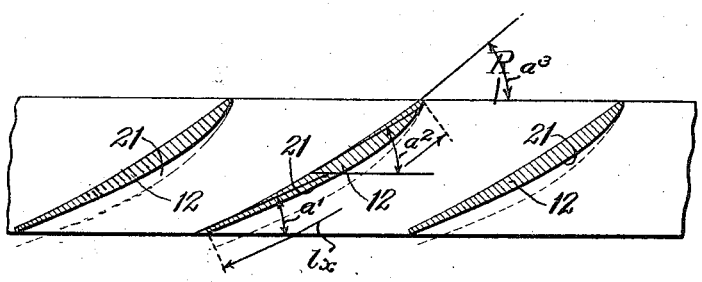
Fig:2.
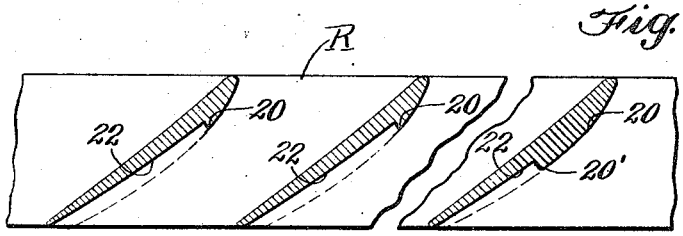
Fig:3.        Fig:3.ª
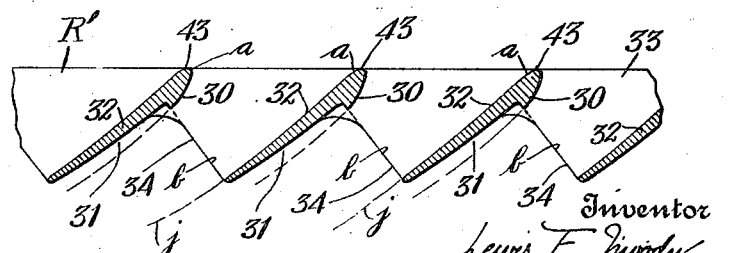
Fig:4.
Inventor  
Lewis F. Moody  
By his Attorneys  
Edwards, Sager & Bower Nov. 16, 1926.  
L. F. MOODY  
HYDRAULIC TURBINE  
Original Filed May 16, 1921    2 Sheets-Sheet 2

Patented Nov. 16, 1926.

1,606,887

UNITED STATES PATENT OFFICE.

LEWIS FERRY MOODY, OF PHILADELPHIA, PENNSYLVANIA.

HYDRAULIC TURBINE.

Application filed May 16, 1921, Serial No. 469,936. Renewed December 28, 1923.

This invention relates to hydraulic turbines and particularly to turbines of moderate and high specific speed. The chief object of the invention is to improve the performance and efficiency of a turbine both under normal and part gate conditions by reducing the resistance to the flow and to the rotation of the runner.

A further object of the invention is to avoid corrosion of the runner vanes caused by areas of low pressure in the flow along the rear surfaces of the vanes.

Further objects of the invention particularly in the formation of the turbine parts to maintain the air spaces between the flow and the runner vane surfaces will appear from the following description taken in connection with the accompanying drawings in which—

Fig. 1 is a vertical sectional view of a portion of a turbine illustrating one embodiment of the invention.

Fig. 2 is a diagrammatic sectional view through the runner vanes.

Fig. 3 is a view similar to Fig. 2 illustrating a modified form of runner.

Figure 5:
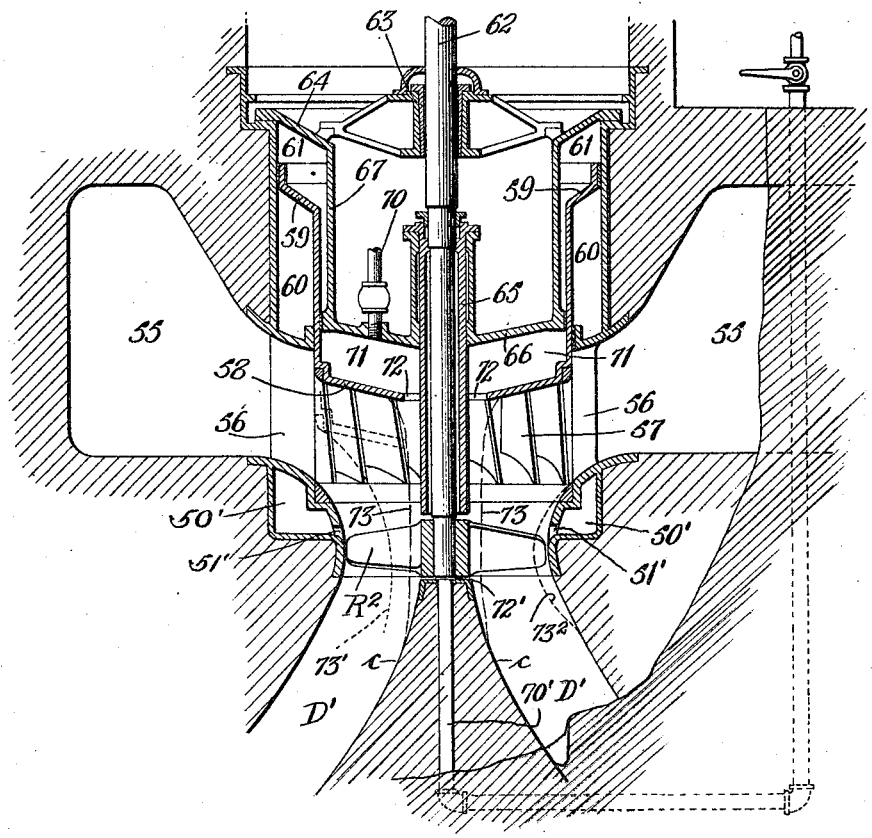

Fig. 3$^a$ is a view similar to Fig. 3 illustrating a further modification.

Fig. 4 is a similar view illustrating a further modification, and

Fig. 5 is a sectional view similar to Fig. 1, but with portions indicated at different planes, and illustrating a modification.

In the specific embodiment of the invention shown in the drawings the runner R of a turbine of the reaction type has a vertical shaft 10 and a hub 11 tapering in the direction of the discharge. The runner vanes 12 are diagonally inclined and extend across the passage 13. The flow entering by intake passage 14, preferably of the volute type, is given a whirl and passes on through inclined guide vanes 15 and into the transition space 16 where its whirl is increased and it is turned toward the axial direction and passed through the runner R at high velocity. A top casting 17 carries a bearing 18 for the shaft 10 and has a conical guiding surface 19 forming the inner wall of the transition space 16. The flow discharging from the runner R passes out through the draft tube D, which may be of the type shown or have a central core extending up into proximity to the runner.

By employing a sufficiently high velocity head in the water entering the runner, the pressure head can be reduced to atmospheric or lower, so that by providing the opening 25 air will flow into the space in advance of the runner, forming a continuous body of air through the central portion of the runner surrounding its hub.

The runner vanes 12 are of simple contour extending across the flow lines and they are preferably relatively flat, deflecting the water but little and causing but little change in the amount of the velocity of the water passing through them, as is consistent with the development of a comparatively low torque and correspondingly high speed. The flow considered relatively to the runner vanes may approach closely to the flow in an impulse turbine in which there is no change in the pressure head, and (in an axial flow impulse runner) but little change in the relative velocity as the water passes through the runner. If the flow is permitted to part from the backs of the runner vanes so as to remain in contact only with the faces of the vanes a reduction in surface friction will result by keeping the water away from the back surfaces of the vane. The result is increased efficiency and may be effected with little change in the velocity relations since the flow through a high speed, light torque runner involves little change in the amount of the velocity.

The driving faces of the vanes are helicoidal and of varying pitch as shown by the successive angles $a^3$, $a^2$ and $a'$ in Fig. 2. The length of the blade face is such that at any point of the blade face the line $1^x$ of intersection of the blade face with a stream line surface passing through said surface is greater than the circumferential pitch in this stream line surface at the discharge end of the runner.

The separation of the flow from the back surfaces of the vanes 12 may be effected by the angle and contour of the vane surfaces with relation to the flow (Fig. 2) or the vanes may be provided with a projecting lip 20 (Fig. 3) on the back of each vane and close to the inflow edge. The spaces 21 at the backs of the vanes or at 22 at the backs of the vanes and below each of the lips 20 will then be filled with air and the flow will be separated from these back surfaces not only reducing the surface friction but also avoiding pitting and corrosion of said surfaces, and each lip 20 will produce a wide channel for the flow of air from the hub or tip to the entire length of the vane. When the flow is not permitted to leave these surfaces there is a decided tendency for the water to lower its pressure along them at such a rapid rate that the stream parts from the surface leaving eddying water in contact with the vane and creating backward flow and eddies and causing rapid corrosion and wear. In many cases it may be desirable to position this lip 20 near the vane center for instance as indicated at 20' in Fig. 3$^a$. It may be noted that the action from the inlet edge of the runner vane to the edge of the lip 20, 20' where the water separates from the back of the vane is that of a reaction turbine, and that beyond this point the action is that of an impulse turbine, since there may be a pressure drop from the inlet edge of the vane to the point of separation of the water from the vane, the pressure beyond this point being constant.

A further advantage of the separation of the flow from the vane surfaces is the improvement of part gate efficiencies due to the filling of the space behind each vane by air instead of water in an eddying, turbulent condition. In furtherance of this advantage it may also be desirable to permit the water to part from either one or both of the walls of the passage 13 in which the runner is located. For instance air may be introduced around the runner shaft by passages 25 and this will serve to supply the spaces behind the runner vanes and at part gate the flow will be formed with a free surface surrounding the turbine axis, the space within this surface being filled with air and not with eddying water as would be the case without an air inlet. When there is no such air admission the water is obliged to fill the entire space even when this involves sudden enlargement of the stream's cross-section, and under off-normal conditions of operation this causes eddies and backward flow at some points. With air admission the water can maintain its natural velocity and contract to the stream cross-section required by this velocity, thus adjusting the area of the stream cross-section to the amount of water admitted, the remainder of the space within the enclosing walls being filled with air.

In many turbines of the ordinary reaction type it may be desirable to limit the admission of air to certain conditions of operation. For example, at small gate openings when there is a tendency for such turbines to develop a vortex at the axis, if air were introduced at this time and the water permitted to form a rotating mass having a free surface, a large part of the eddies which ordinarily exist during this part gate condition would be eliminated. A large portion of the runner which would ordinarily be dragged through the water would now move through the air with comparatively little windage loss. It has been observed, for example, in ordinary turbines that in starting the turbine with the guide vanes only slightly opened, the turbine will run at a higher speed while the draft tube remains filled with air than will be the case after the air is completely discharged from the tube and the runner begins to operate entirely in water. At the instant the draft tube becomes filled with water a noticeable slowing down in speed of the turbine results. A turbine operated at low gate opening has a natural tendency to run as an impulse turbine, and only the exclusion of air forces it to operate as a reaction turbine. In many cases, therefore, it will be advantageous to admit air to the runner up to some definite gate opening and beyond this point to close the air inlet and operate at larger gate openings as a reaction turbine. For this purpose the air inlet 25' may be provided with means such as valve 26 with connections to close the valve at some definite gate opening. For instance, these connections may comprise a cam $c$ on arm $a$ of the wicket gate 15 moving the arm $b$ of valve 26 to control the valve. It will also be desirable to provide the air supply connections with check valves closing whenever the pressure of the water rises above atmospheric so as to prevent a backward flow into the air supply, and opening whenever the water pressure drops so as to draw in air.

In the embodiment of the invention shown in Fig. 4 the runner R' has the rear lips 30 placed opposite the tips of the preceding vanes as indicated by lines $b$ so that the parting of the water from the vane surfaces will take place only over the portion 31 of the vanes 32 lying beyond the discharge orifices $b$. In such a runner there will be a drop in pressure over the vanes from $a$ to $b$ with a corresponding acceleration of relative velocity. At $b$ the water will discharge as free jets $j$ running clear of contact with the vane surfaces beyond the point $b$. Where the runner is shrouded as at 33 the shrouding may be formed to have edges 34 along orifices $b$ as shown completing the edges of the nozzles for the jets $j$ and leaving these discharged jets entirely free of all sides. The vanes 32 are shown modified for a relatively lower or moderate specific speed with the entrance edges 43 rounded to suit a wide variation of the relative angle of entrance of the flow.

In the admission of air around the runner it may be desirable to provide an air space around the tips of the runner vanes either in addition to or instead of the central air supply around the hub. For instance in Fig. 1 an air supply passage 50 may be provided having openings 51 leading into the turbine conduit adjacent the tips of the runner vanes. Such an air supply will maintain an air space 52 around the runner tips reducing friction and serving to supply air to the spaces at the backs of the vanes. Such an air space will also aid in reducing wasteful eddying of the flow under part gate conditions and thus increase the efficiency of the turbine.

In Fig. 5 a modified form of turbine is shown in which the flow enters by volute 55 and passes with a whirl through the fixed vanes 56 into transition space 57 wherein the whirling flow is turned toward the axial direction onto the runner $R^2$ from which it discharges into draft tube D' having a central core C extending into proximity with the runner. The flow to the runner is controlled by the plunger gate 58 sliding in the stay vane ring 56 and having the piston portion 59 moved by fluid pressure in spaces 60, 61. The shaft 62 of the runner $R^2$ has a bearing 63 in cover 64 and passes down through a sleeve 65 suspended from the end 66 of the stationary cylinder 67. An air supply pipe 70 opens into the space 71 between the cover 66 and plunger gate 58 and this gate has a central opening 72 through which the air is drawn around the sleeve 65 down to the runner vanes, forming a central air space for the whirling vortex of the inflow in transition space 57. This central air supply is particularly advantageous in this plunger gate type of turbine in permitting the flow in the transition space to have a free surface 73 at the center. As the gate 58 is closed and the flow is restricted the water does not have to fill the transition space but passes therethrough as a smooth annular stream with central free surfaces 73' within which is an air space. At part gate therefore restriction of the flow will be attained by the enlarging of the central air space or core and the free surface of the stream will recede outward away from the axis. In this way sudden enlargement of the stream and the resultant wasteful disturbances are avoided and smooth efficient conditions of flow are maintained at all gate openings.

In the arrangement of Fig. 5, air admission may also be provided around the outer wall of the transition space as in the Fig. 1 arrangement. Passages similar to 50, with openings 51, shown in Fig. 1 would be used for this purpose (as shown at 50', 51'), either in addition to or instead of the openings 72. By means of these openings the flow would be permitted to spring clear of the outer wall, as shown at $73^2$.

It is desirable to regulate the entrance of air and to restrict it to a rate only sufficient to maintain continuous air spaces in and around the runner without causing an undue amount to enter into suspension in the water and to pass on with it. Air which becomes mixed with the water and flows away with it reduces the effectiveness of the draft tube to some extent.

In some cases where the runner is placed below or near the tail water, a rise in the tail water level may tend to submerge the runner, and in such event the air supply may be closed and the turbine operated as a reaction turbine. Sometimes, however, where the entrance pressure is above atmospheric because of abnormally high tail water or for other reasons, it may be advantageous to put pressure on the air supply to raise it sufficiently above atmospheric to overcome the water pressure and to maintain the air spaces as desired.

When a central core is used in the draft tube as in Fig. 5, air may be admitted to the draft tube below the runner to form a central air space through a pipe or passage 70' and opening 72' shown in lines carried up through the core C, either in addition to or instead of the pipe 70 and openings 72. The air space thus supplied from below the runner will under part load conditions usually extend upward into the runner, this action being promoted by the reversal of flow which occurs in most runners in the portion near the axis during part gate operation, the flow in this region then being upward. The passage 70', 72' will in general be provided with valve control means similar to all of the air inlets previously described.

A further purpose and advantage of admitting air to the draft tube, either directly or through the runner, is the avoidance of the vibration or surging which sometimes results from the formation of eddies or cavities within the draft tube.

I claim:

1. In a hydraulic turbine the combination with means for directing the flow to the runner as in a reaction turbine, of runner vanes having their back surfaces formed to cause a separation of the flow from said back surfaces.

2. In a turbine the combination with means for directing the flow to the runner as in a reaction turbine and imparting a whirl to said flow, of runner vanes having their back surfaces formed to cause a separation of the flow from said back surfaces.

3. In a turbine the combination with means for directing the flow to the runner as in a reaction turbine, of runner vanes having their back surfaces formed to cause a separation of the flow from said back surfaces under certain conditions and to permit the flow to contact with said surfaces under other conditions.

4. In a turbine the combination with means for directing the flow to the runner as in a reaction turbine, of runner vanes formed to cause the flow to separate from the back surfaces of said vanes at the inflow edge.

5. In a turbine the combination with means for directing the flow to the runner as in a reaction turbine, of runner vanes having projecting lips along their back surfaces to cause the water to separate from said surfaces.

6. In a reaction turbine the combination with means for directing the flow to the runner as in a reaction turbine, of runner vanes having their back surfaces formed to cause a separation of the flow from said back surfaces and air inlet means adjacent the runner hub for supplying air to the spaces between said flow and said back surfaces.

7. In a turbine the combination with means for directing the flow against the runner, of runner vanes having their back surfaces formed to cause a separation of the flow from said back surfaces under certain conditions and to permit the flow to contact with said surfaces under other conditions and air inlet means adjacent the runner hub for supplying air to the spaces between said flow and said back surfaces.

8. In a turbine the combination with means for directing the flow to the runner as in a reaction turbine, of runner vanes having projecting lips along their back surfaces to cause the water to separate from said surfaces and air inlet means adjacent the runner hub for supplying air to the spaces between said flow and said back surfaces.

9. In a turbine the combination with means for directing the flow to the runner as in a reaction turbine, of runner vanes having their back surfaces formed to cause a separation of the flow from said back surfaces and air inlet means adjacent the runner tips for supplying air to the spaces between said flow and said back surfaces.

10. In a turbine the combination with means for directing the flow against the runner, of runner vanes having their back surfaces formed to cause a separation of the flow from said back surfaces under certain conditions and to permit the flow to contact with said surfaces under other conditions and air inlet means adjacent the runner tips for supplying air to the spaces between said flow and said back surfaces.

11. In a turbine the combination with means for directing the flow to the runner as in a reaction turbine, of runner vanes having projecting lips along their back surfaces to cause the water to separate from said surfaces and air inlet means adjacent the runner tips for supplying air to the spaces between said flow and said back surfaces.

12. In a turbine the combination with means for directing the flow to the runner as in a reaction turbine, of runner vanes having their back surfaces formed to cause a separation of the flow from said back surfaces and air inlets adjacent the runner tips for supplying air to the spaces between said flow and said back surfaces.

13. In a turbine the combination with means for directing the flow against the runner, of runner vanes having their back surfaces formed to cause a separation of the flow from said back surfaces under certain conditions and to permit the flow to contact with said surfaces under other conditions and air inlet means adjacent the runner hub and tips for supplying air to the spaces between said flow and said back surfaces.

14. In a turbine the combination with means for directing the flow to the runner as in a reaction turbine, of runner vanes having projecting lips along their back surfaces to cause the water to separate from said surfaces and air inlet means adjacent the runner hub and tips for supplying air to the spaces between said flow and said back surfaces.

15. In a turbine the combination with means for directing the flow against the runner, of air supply means for admitting air to the runner surfaces and means controlling said air supply and adapted to limit it to predetermined conditions of turbine operation.

16. In a turbine the combination with means for directing the flow against the runner, of air supply means for admitting air to the runner surfaces and means controlling said air supply and adapted to limit it to predetermined load conditions of turbine operation.

17. In a hydraulic turbine the combination with a runner having the flow under normal load conditions filling the space between successive vanes for at least a portion of the length thereof, and means for causing said flow to have a free surface between successive vanes under other load conditions so that the reaction effect of the flow under normal load conditions is changed to an impulse effect under other conditions.

18. In a hydraulic turbine the combination with a runner having the flow under normal load conditions filling the space between successive vanes for at least a portion of the length thereof, and means for causing said flow to have a free surface between successive vanes under part gate conditions so that the reaction effect of the flow under normal load conditions is changed to an impulse effect under part gate conditions.

19. In a hydraulic turbine a runner having vanes formed to provide passages between them which will be filled with water for a portion of their length and for the remainder of their length will pass the flow as free jets only partly filling the spaces between said vanes.

20. In a hydraulic turbine a runner having vanes forming passages between them adapted to be filled by the flow at one portion and to be only partly filled by the flow at another portion, so that said runner is adapted to operate at one part as a reaction turbine and at another part as an impulse turbine.

21. In a hydraulic turbine the combination of a runner having the flow under predetermined low conditions filling the space between successive vanes for at least a portion of the length thereof, means for causing said flow as desired to leave a free surface between successive vanes so that said turbine is adapted to operate either as a reaction turbine or as an impulse turbine.

22. In a hydraulic turbine the combination with a runner of means for directing the flow thereto comprising an inner surface and an outer surface, and means for admitting air to the backs of the runner vanes comprising a substantially continuous opening around the said inner surface.

23. In a hydraulic turbine the combination with a runner of means for directing the flow thereto comprising an inner surface and an outer surface, and means for admitting air to the backs of the runner vanes comprising a substantially continuous opening around the said outer surface.

24. In a hydraulic turbine the combination with a runner of means for directing the flow thereto comprising an inner surface and an outer surface, and means for admitting air to the backs of the runner vanes comprising a substantially continuous opening around the said outer surface at the entrance side of said runner.

25. In a hydraulic turbine the combination with a runner of means for directing the flow thereto comprising an inner surface and an outer surface, and means for admitting air to the backs of the runner vanes comprising a substantially continuous opening around the said outer surface in advance of said runner.

26. In a hydraulic turbine having a sufficiently high velocity head in the water entering the runner to reduce the pressure at the runner entrance to a value less than that of atmosphere, an opening or openings around the inner wall of the entrance space leading to the runner, and passages leading air to said opening or openings and thence to the runner.

27. In a hydraulic turbine having a draft tube containing a central core, an air passage within said core opening into the draft tube near the upstream end of the core for supplying air to the central region of the draft tube.

28. In a hydraulic turbine having a runner and a draft tube containing a central core extending into proximity to the runner, an air passage within said core opening into the draft tube near the upstream end of the core for supplying air to the central region of the draft tube.

29. In a hydraulic turbine having a water conduit contained within stationary walls and a runner in said conduit, means for admitting air into the central portion of said conduit below the runner through an opening or openings stationary with said walls.

30. In a hydraulic turbine in combination with a runner and a passage leading the water through said runner, portions of the walls of said passage being stationary, means for admitting air into the central portion of said passage below the runner through openings in a stationary portion of said walls.

31. In a hydraulic turbine having a runner and a draft tube stationary pipe means opening into the draft tube in the central region of the draft tube below the runner and adapted to supply air to said central region.

32. In a hydraulic turbine having a runner and a draft tube stationary pipe means opening into the draft tube in the central region of the draft tube below the runner and adapted to supply air to said central region, and means controlling said air supply and adapted to supply air only under predetermined conditions of turbine operation.

33. In a hydraulic turbine having a runner and a draft tube the combination with a central core member in said draft tube below said runner, of means admitting air to the central region of said draft tube around said central core.

34. In a hydraulic turbine having a runner and a draft tube the combination with a central core member in said draft tube below said runner, of stationary means admitting air to the central region of said draft tube around said central core.

35. In a hydraulic turbine the combination with a runner and means for directing the flow against the runner, of stationary air supply means for admitting air to the runner surfaces.

36. A hydraulic turbine comprising an unshrouded runner of substantially axial flow type and having a relatively small hub, means for directing the inflow to said runner as a continuous whirling column, and means for supplying air to said flow to maintain it fully separated from said hub.

37. A hydraulic turbine comprising an unshrouded runner of substantially axial flow type and having a relatively small hub, means for directing the inflow to said runner as a continuous whirling column, and means for supplying air to said flow to maintain it fully separated from said hub, and a draft tube recovering the velocity energy of the discharge from said runner.

38. In a hydraulic turbine the combination with a turbine conduit formed by inner and outer surfaces of revolution and adapted to form the inflow into a continuous annular column around the axis, of a runner with its hub forming a portion of said inner surface of revolution and having unshrouded blades extending from said hub, and an air supply through said outer surface of revolution adapted to maintain the flow separated from the portion of said outer surface adjacent the tips of said blades.

39. In a hydraulic turbine having a sufficiently high velocity head in the water entering the runner to reduce the pressure at the runner entrance to a value less than that of atmosphere, stationary means for admitting air to the entrance space leading to the runner.

40. A hydraulic turbine adapted to operate as an impulse turbine comprising a radial inflow portion, means for turning the flow toward the axial direction, an unshrouded runner receiving said flow, and means supplying air to said flow to maintain it fully separated from the back surfaces of the runner blades from the entrance edges to the discharge edges.

41. A hydraulic turbine adapted to operate as an impulse turbine comprising a radial inflow portion adapted to impart a whirl to the entering flow, means for turning the flow toward the axial direction, an unshrouded runner receiving said whirling flow, and means supplying air to said flow to maintain it fully separated from the back surfaces of the runner blades from the entrance edges to the discharge edges.

42. A hydraulic turbine adapted to operate as an impulse turbine comprising an unshrouded runner of substantially axial flow type, and having a relatively small hub, means for directing the inflow to said runner as a solid whirling column, and means for supplying air to said flow to maintain it fully separated from the back surfaces of the runner blades from the entrance edges to the discharge edges.

43. A hydraulic turbine adapted to operate as an impulse turbine comprising an unshrouded runner of substantially axial flow type, and having a relatively small hub, means for directing the inflow to said runner as a solid whirling column, and means for supplying air to said flow to maintain it fully separated from the back surfaces of the runner blades from the entrance edges to the discharge edges and a draft tube recovering the velocity energy of the discharge.

44. In a hydraulic turbine the combination with a turbine conduit formed by inner and outer surfaces of revolution and adapted to form the inflow into a continuous annular column around the axis, of a runner with its hub forming a portion of said inner surface of revolution and having blades formed to pass the flow therethrough in separate jets having free surfaces between the jets and the back surfaces of the vanes, and an air supply for said runner adapted to provide a continuous flow of air to said jet surfaces.

45. In a hydraulic turbine the combination with a turbine conduit formed by inner and outer surfaces of revolution and adapted to form the inflow into a continuous annular column around the axis, of a runner with its hub forming a portion of said inner surface of revolution and having blades formed to pass the flow therethrough in separate jets having free surfaces between the jets and the back surfaces of the vanes, and an air supply exterior to said runner adapted to provide a continuous flow of air to said jet surfaces.

46. In a hydraulic turbine the combination with a turbine conduit formed by inner and outer surfaces of revolution and adapted to form the inflow into a continuous annular column around the axis, of a runner with its hub forming a portion of said inner surface of revolution and having blades formed to pass the flow therethrough in separate jets having free surfaces between the jets and the back surfaces of the vanes, and an air space continuous around the axis and in communication with each of said jet surfaces.

47. In a hydraulic turbine the combination with a turbine conduit formed by inner and outer surfaces of revolution and adapted to form the inflow into a continuous annular column around the axis, of a runner with its hub forming a portion of said inner surface of revolution and having blades formed to pass the flow therethrough in separate jets having free surfaces between the jets and the back surfaces of the vanes, an air space in communication with each of said jet surfaces, and a velocity decelerating draft tube receiving the flow discharged from said runner and acting to convert velocity energy into presure head so as to lower the back pressure.

48. In a hydraulic turbine the combination with a runner having blades formed to guide the flow so that there is but little change in the velocity of the flow relatively to the blade surfaces, of means for admitting air to the flow adjacent said runner so that the flow will be permitted to part contact with the back surfaces of the blades without substantial change in velocity.

49. In a hydraulic turbine the combination with a runner having blades adapted to guide the flow therethrough so as to permit the flow to separate from the back surfaces of the vanes, a cylinder gate controlling the flow to said runner, and means for admitting air to the flow between said gate and said runner so as to cause the flow to part contact with the back surfaces of the blades.

50. In a hydraulic turbine the combination with an intake and runner and a transition space between said intake and runner, of a cylindrical plunger moving in said transition space and having an annular opening in its central portion through which air may be admitted.

51. In a hydraulic turbine the combination with intake means adapted to form the flow into a whirling column, of a runner receiving said flow and having relatively flat blades with but little change in angle from entrance to exit so as to produce only a small amount of deflection of the stream passing through the runner, and stationary air supply means for admitting air to the runner surfaces.

52. In a hydraulic turbine having a sufficiently high velocity head in the water entering the runner to reduce the pressure at the runner entrance to a value less than that of atmosphere, an opening or openings around the inner wall of the entrance space leading to the runner, and passages leading air to said opening or openings and thence to the runner and having valve means for controlling the rate of admission of air.

53. In a hydraulic turbine the combination with an intake adapted to direct the flow against a runner, of a runner having a transverse area of channel between successive blades which decreases through a limited portion of the length of the channel, and means to admit air to the backs of the blades in the portion of the channel length succeeding said limited portion.

54. In a hydraulic turbine the combination with a runner of means for directing the flow thereto comprising an inner surface and an outer surface, and means for admitting air to at least a portion of the spaces between the vanes of said runner comprising a substantially continuous opening around the said inner surface.

55. In a hydraulic turbine the combination with a runner of means for directing the flow thereto comprising an inner surface and an outer surface, and means for admitting air to at least a portion of the spaces between the vanes of said runner comprising a substantially continuous opening around the said outer surface.

56. In a hydraulic turbine the combination with a turbine conduit formed by inner and outer surfaces of revolution and adapted to form the inflow into a continuous annular column around the axis while turning it toward the axial direction, of a runner with its hub forming a portion of said inner surface of revolution and having unshrouded blades extending from said hub, of an air supply through said inner surface of revolution adjacent said blades and near said axis.

57. In a hydraulic turbine, the combination with a turbine conduit formed by inner and outer surfaces of revolution adapted to form the inflow into a continuous annular column around the axis while turning it toward the axial direction, of a propeller type runner having high relative velocity between the blades and the water and relatively light driving torque and stationary air admission means for supplying air to at least a portion of the spaces between the vanes of said runner.

58. In a turbine the combination with means for directing the flow against the runner, of air supply means for admitting air to the flow and means controlling said air supply and adapted to limit it to predetermined load conditions of turbine operation, said air supply control comprising connections to control the supply according to the gate opening.

LEWIS FERRY MOODY.